United States Patent [19]
Chetter

[11] 3,833,471
[45] Sept. 3, 1974

[54] NUCLEAR REACTOR FUEL ELEMENT GRID

[75] Inventor: John Chetter, Lytham-St. Annes, England

[73] Assignee: United Kingdom Atomic Energy Authority, London, England

[22] Filed: June 26, 1972

[21] Appl. No.: 266,067

[30] Foreign Application Priority Data
July 7, 1971    Great Britain .................... 32003/71

[52] U.S. Cl. .................................... 176/78, 176/76
[51] Int. Cl. ............................................. G21c 3/34
[58] Field of Search .............................. 176/76, 78

[56] References Cited
UNITED STATES PATENTS

| | | | |
|---|---|---|---|
| 3,344,855 | 10/1967 | Clark | 176/78 |
| 3,405,033 | 10/1968 | Widell et al. | 176/78 |
| 3,457,140 | 7/1969 | Glandin | 176/76 |
| 3,674,637 | 7/1972 | Delafosse et al. | 176/78 |
| 3,679,546 | 7/1972 | Muellner et al. | 176/78 |
| 3,686,071 | 8/1972 | Gaines | 176/78 |
| 3,751,335 | 8/1973 | Keith | 176/76 |

OTHER PUBLICATIONS
"Navel Nuclear Propulsion Program"–1969, Apr. 23, 1969, p. 214.

*Primary Examiner*—Leland A. Sebastian
*Assistant Examiner*—Roger S. Gaither
*Attorney, Agent, or Firm*—Larson, Taylor & Hinds

[57] ABSTRACT

A spacer grid comprising a grid structure formed from intersecting strip members defining cells which are penetrated by fuel pins bearing against rigid stops projecting inside the cells and spring locating members in the form of bow springs which extend longitudinally in the cells of the grid structure to hold the fuel pins against the rigid stops in the cells, the bow spring members of each line of cells extending in one direction across the grid structure having their corresponding ends interconnected by common longitudinal bridging strips to form a ladder spring assembly.

1 Claim, 7 Drawing Figures

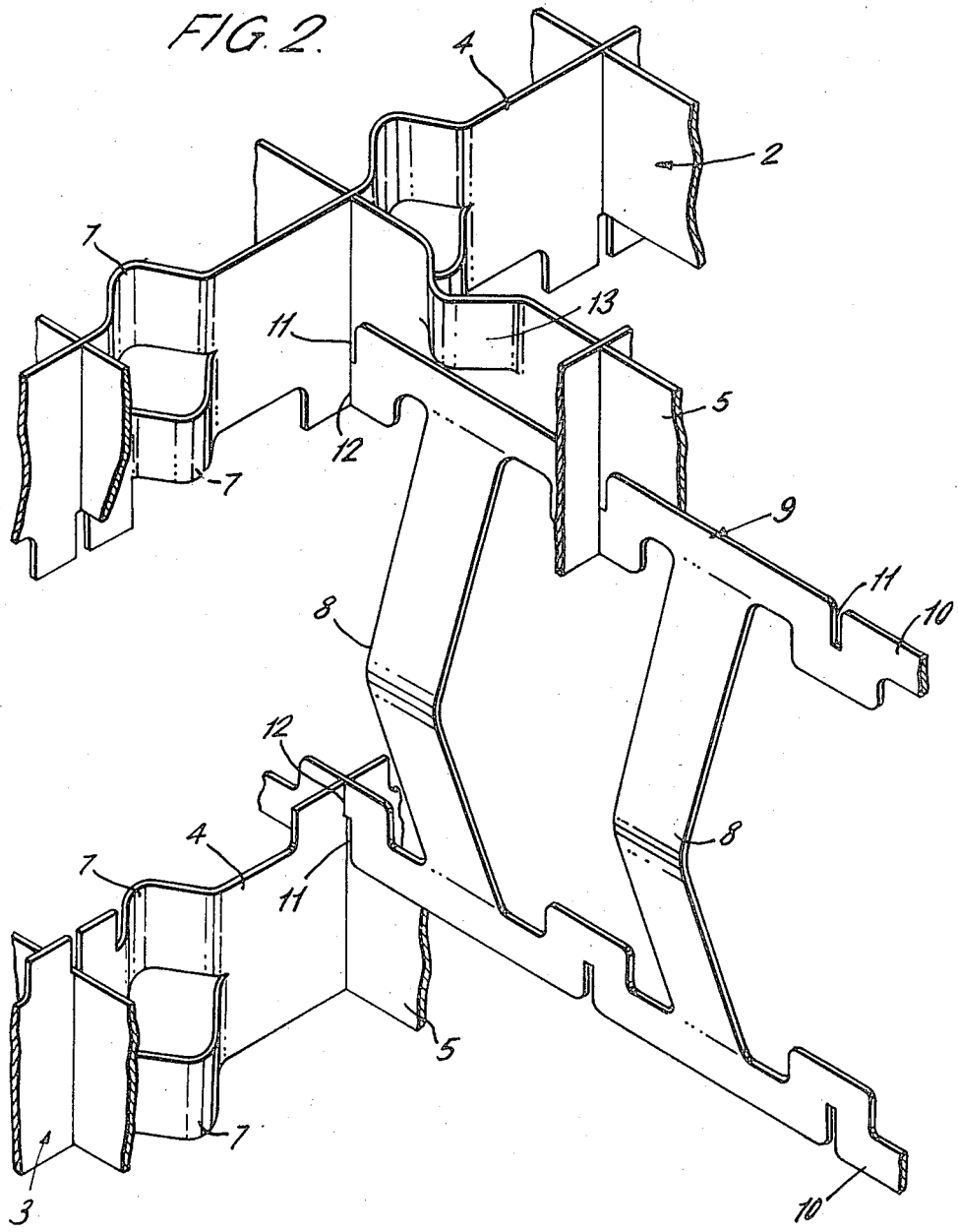

NUCLEAR REACTOR FUEL ELEMENT GRID

BACKGROUND OF THE INVENTION

This invention relates to nuclear reactor fuel element assemblies and in particular to that kind of fuel element assembly including a plurality of elongate fuel pins supported in a bundle with their longitudinal axes parallel. Such a fuel element assembly employs one or more spacer grids disposed intermediate the ends of the assembly and serving to retain the correct lateral location of the fuel pins in the assembly relative to one another. Such grids typically comprise a group of cells each for penetration by a fuel pin and are usually fabricated from thin strip material or thin walled tubes such as stainless steel in an attempt to minimise restriction to reactor coolant flow which is axially through the bundle between the fuel pins.

The invention relates particularly to the form of spacer grid which provides for resilient bracing of the fuel pins in the cells of the grid, for example by spring locating members projecting inside the cells of the grid to hold the fuel pins against opposed rigid dimples or stops, also projecting inside the cells of the grid.

One such spacer grid, hereinafter referred to as of the type described, comprises a grid structure formed from intersecting strip members defining cells which are penetrated by the fuel pins. The fuel pins bear against rigid stops projecting inside the cells of the grid structure. Spring locating members for the fuel pins are preferably in the form of bow springs extending longitudinally in the cells of the grid structure to hold the fuel pins against the rigid stops in the cells.

It is an object of the present invention to provide an improved form of bow spring locating member for the fuel pins in a spacer grid of the type described above. In particular the improvement relates to the manner in which the bow springs are supported and located within the grid structure.

SUMMARY OF THE INVENTION

According to the present invention in a spacer grid of the type described above the bow spring members of each line of cells extending in one direction across the grid structure have their corresponding ends interconnected by common longitudinal bridging strips to form a ladder spring assembly. The ladder spring assemblies are located in the grid structure in directional alignment with the strip members of the grid structure which extend in the same direction as the lines of cells in the grid structure and strip members of the grid structure which run across the direction of the lines of cells in the grid structure are slotted for passage of the ladder spring assemblies.

In a preferred arrangement the spacer grid comprises two longitudinally spaced grid tiers. The grid tiers are formed from intersecting strip members and the fuel pins of the fuel element assembly extend through corresponding cells in the two grid tiers. The fuel pins bear against rigid stops extending inside the cells of the two grid tiers. In this arrangement the ladder spring assemblies extend across the grid structure between the two grid tiers.

In one embodiment the facing edges of the strip members of the two grid tiers which run across the direction of location of the ladder spring assemblies have transverse slots for accommodation of the longitudinal bridging strips of the ladder spring assemblies. In a further embodiment the facing edges of the strip members in the two grid tiers which run in the same direction as the direction of location of the ladder spring assemblies have transverse slots at intervals along their length, the edge parts of the strip members between the transverse slots being alternately offset to one side or the other of the plane of the strip members, and the longitudinal bridging strips of the ladder spring assemblies being located between the alternately offset edge parts of the strip members.

The ladder spring assemblies may be in a number of forms. In one form the bow spring members all extend to one side of the plane of the ladder spring assembly, being associated with the line of cells in the spacer grid on said one side of the assembly. In another form the bow spring members extend alternately to one side or the other of the plane of the ladder spring assembly, the bow spring members being associated with alternate cells in the lines of cells in the spacer grid on either side of the assembly.

In yet a further form the longitudinal bridging strips of the ladder spring assembly have laterally extending V-shaped sections joined by straight sections of bow spring members extending between the sides of corresponding V-sections of the bridging strips along either edge of the assembly. This form of ladder spring assembly is particularly applicable in a spacer grid having cells of rectangular form with rigid stops extending into the cells from adjacent sides of the cells. This form of ladder spring assembly is located in the spacer grid so that the bow spring members are positioned at the corners of the cells facing diagonally across the cells towards the rigid stops in the cells.

DESCRIPTION OF THE DRAWINGS

Embodiments of the invention will now be described by way of example with reference to the accompanying drawings in which:

FIG. 2 is an isometric detail of the spacer grid shown in FIG. 1.

DESCRIPTION OF THE PREFERRED EMBODIMENTS

Figure 1:
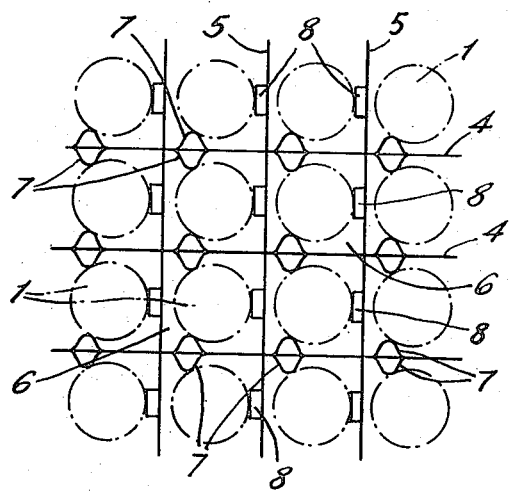
FIG. 1 is a cross sectional elevation of part of a nuclear reactor fuel element assembly including one form of spacer grid in accordance with the invention.

FIG. 1 of the drawings shows part of a nuclear reactor fuel element assembly comprising a plurality of cylindrical fuel pins 1 arranged with their longitudinal axes parallel. The fuel pins 1 are spaced apart and located at points intermediate their ends by transverse spacer grids one of which is shown in part in FIGS. 1 and 2. Each spacer grip comprises parallel upper and lower grid tiers 2 and 3 held together by a deep outer band (not shown). The grid tiers 2 and 3 are formed from intersecting strip members 4 and 5. The fuel pins 1 of the fuel element assembly extend through corresponding cells 6 in the upper and lower grid tiers 2 and 3. The strip members 4 which run in the one direction across the grid tiers 2 and 3 are dimpled to form rigid stops 7 for the fuel pins 1 in the cells 6. Two stops 7 extend inwardly into each cell 6 from opposite sides of the cell 6. The fuel pins 1 are held against the stops 7 by bow springs 8 which extend longitudinally between the grid tiers 2 and 3. The bow springs 8 of each line of cells 6 which run transversely to the strip members 4 of the two grid tiers 2 and 3 form part of a ladder spring assembly 9. The corresponding ends of the bow springs 8 in the ladder spring assembly 9 are interconnected by longitudinal bridging strips 10. The ladder spring assemblies 9 are located transversely to the strip members 4 in the upper and lower grid tiers 2 and 3 and in alignment with the strip members 5. The longitudinal bridging strips 10 of the ladder spring assemblies 9 intersect with the facing edges of the strip members 4 in the two grid tiers 2 and 3. The bridging strips 10 of the ladder spring assemblies 9 have transverse slots 11 which interlock with transverse slots 12 in the edges of the strip members 4 in the grid tiers 2 and 3.

The ladder spring assemblies 9 may be fitted between the grid tiers 2 and 3 with no lengthwise clearance existing between the transverse slots 11 in the bridging strips 10 of the ladder spring assemblies 9 and the transverse slots 12 in the edges of the strip members 4 of the grid tiers 2 and 3. In this case on flexing of the bow springs 8 the bridging strips 10 of the ladder spring assemblies 9 are held against outward movement in the grid structure so as to provide an "encastre" effect at the ends of the bow spring 8.

Alternatively the ladder spring assemblies 9 may be fitted between the grid tiers 2 and 3 with a small lengthwise clearance existing between the transverse slots 11 in the bridging strips 10 of the ladder spring assemblies 9 and the transverse slots 12 in the edges of the strip members 4 of the grid tiers 2 and 3. In this case on flexing of the bow springs 8 the bridging strips 10 of the ladder spring assemblies 9 can move outwards in the grid structure thus giving a "free" effect to the ends of the bow springs 8. The strip members 5 which run transverse to the strip members 4 in the grid tiers 2 and 3 are dimpled to form rigid back stops 13 in each of the cells 6 of the two grid tiers. One back stop 13 extends into each cell 6 from the side of the cell 6 corresponding to the position of the related bow spring 8. The back stops 13 limit the degree of movement of the fuel pins 1 away from the stops 7 in the cells 6 against the action of the bow springs 8.

Figure 3:
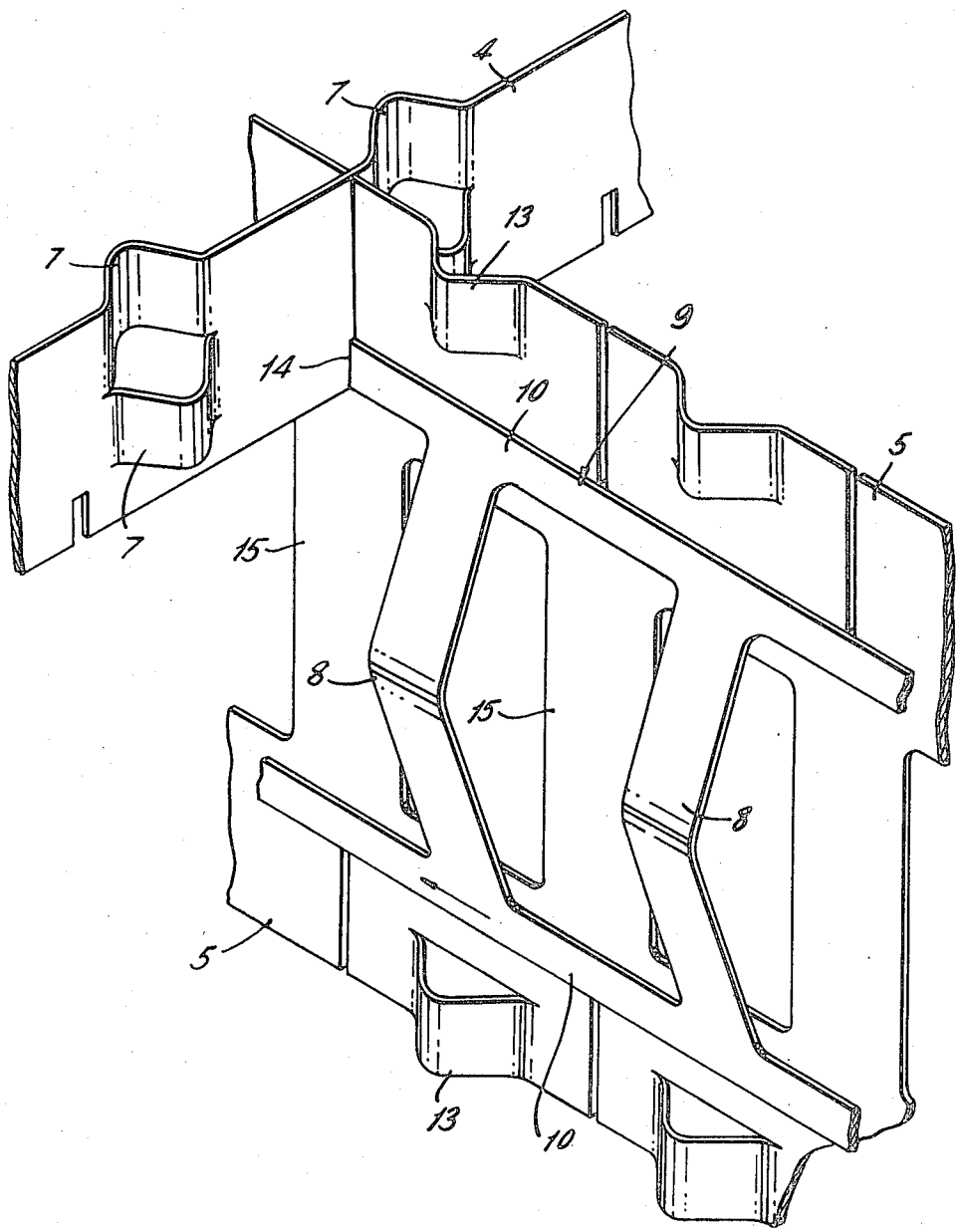
FIG. 3 is an isometric detail of a modified form of the spacer grid shown in FIGS. 1 and 2.

FIG. 3 shows a modification of the spacer grid of FIGS. 1 and 2. In FIG. 3 the bridging strips 10 of the ladder spring assemblies 9 are plain and extend through transverse slots 14 in the strip members 5 which run transverse to the ladder spring assemblies 9 in the two grid tiers 2 and 3.

In the spacer grid of FIG. 3 the grid tiers 2 and 3 in addition to being connected by an outer band are also connected by webs 15 extending between the strip members 5 of the grid tiers 2 and 3.

Figure 4:
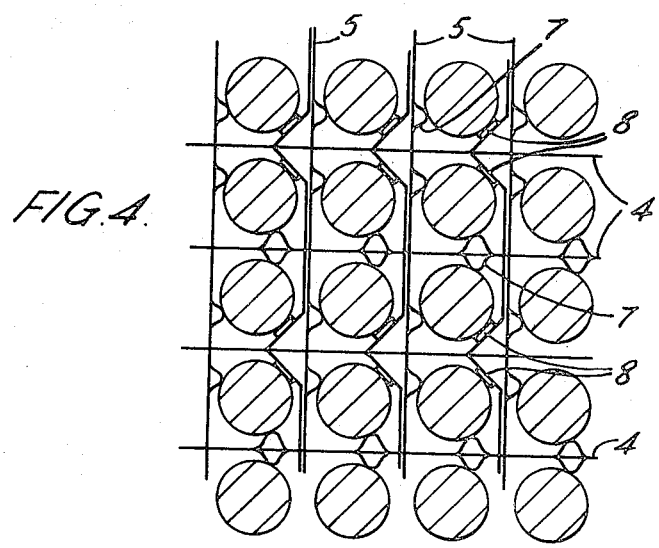
FIG. 4 is a cross sectional elevation of part of a nuclear reactor fuel element assembly including a second form of spacer grid in accordance with the invention.
Figure 5:
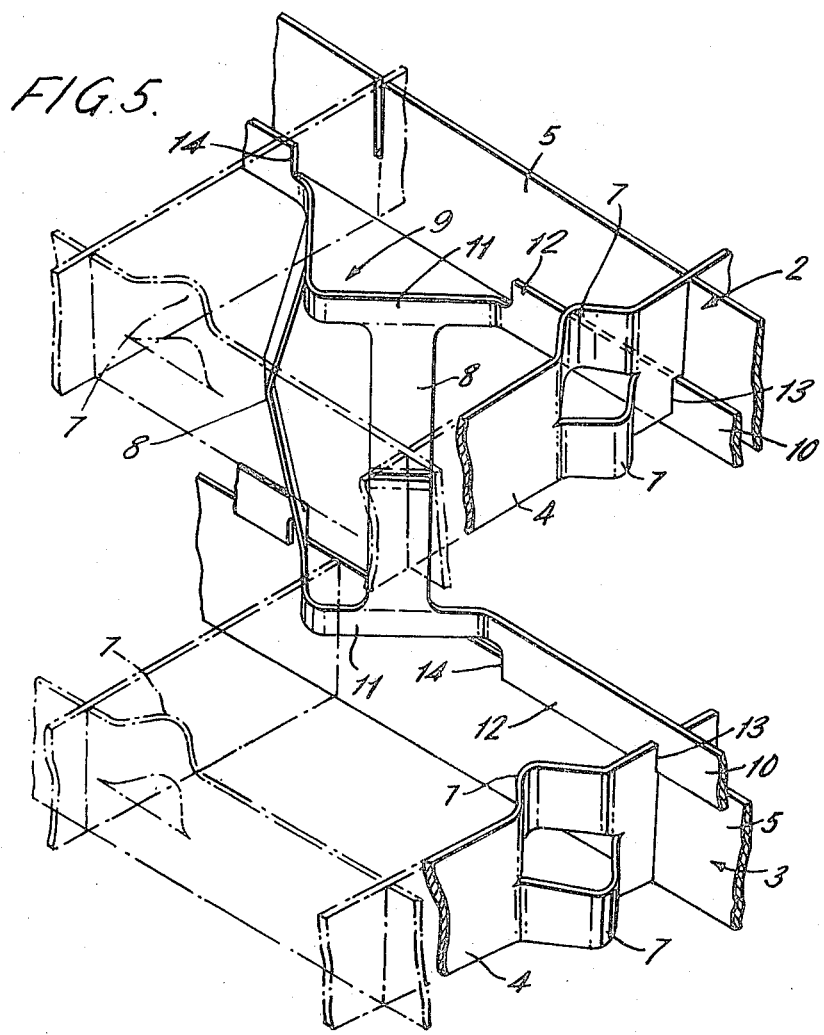
FIG. 5 is an isometric detail of the spacer grid shown in FIG. 4.

FIGS. 4 and 5 show another form of spacer grid in accordance with the invention. Again this spacer grid comprises upper and lower grid tiers 2 and 3, the grid tiers 2 and 3 being formed from intersecting strip members 4 and 5. The fuel pins 1 of the fuel assembly extend through corresponding cells 6 in the upper and lower grid tiers 2 and 3. Alternate strip members 4 in the grid tiers 2 and 3 are dimpled on both faces and each of the strip members 5 in the grid tiers 2 and 3 is dimpled on one face to form rigid locating stops 7 for the fuel pins 1 in the cells 6 of both grid tiers 2 and 3. Each cell 6 has two stops 7 extending inwardly from adjacent sides of the cell 6. The fuel pins 1 are held against the stops 7 in the cells 6 by bow springs 8 extending longitudinally between the upper and lower grid tiers 2 and 3. The bow springs 8 of each line of cells 6 which run transversely to the strip members 4 of the two grid tiers 2 and 3 form part of a ladder spring assembly 9. The corresponding ends of the bow spring assemblies 9 are connected by bridging strips 10. The bridging strips 10 have V-sections 11 connected by straight sections 12. The bow springs 8 extend between the sides of the V-sections 11 of the bridging strips 10. The ladder spring assemblies 9 are located transversely to the strip members 4 in the grid tiers 2 and 3 and in alignment with the strip members 5 so that the bow springs 8 extend between the corresponding corners of related cells 6 in the grid tiers 2 and 3 diagonally opposite to the stops 7 in the cells 6. The straight sections 12 of the bridging strips 10 in the ladder spring assemblies 9 extend through transverse slots 13 in the facing edges of the strip members 4 of the grid tiers 2 and 3. The V-sections 11 of the bridging strips 10 have cut away portions 14.

Figure 6:
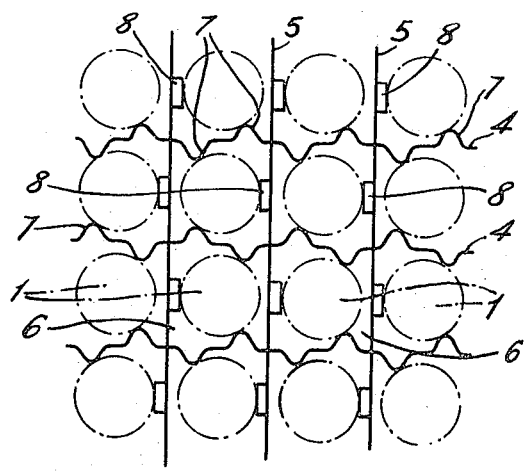
FIG. 6 is a cross sectional elevation of part of a nuclear reactor fuel element assembly including a third form of spacer grid in accordance with the invention.
Figure 7:
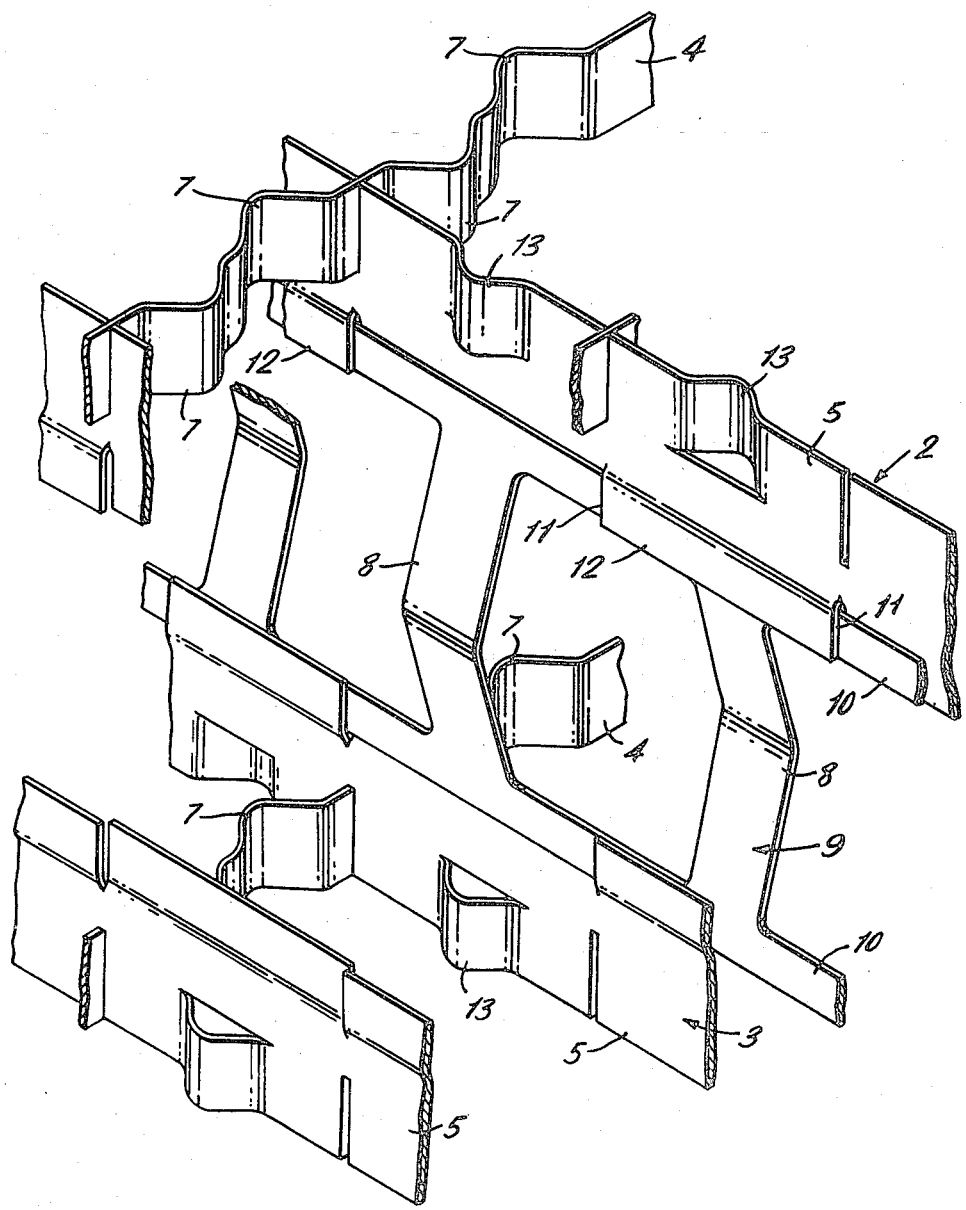
FIG. 7 is an isometric detail of the spacer grid shown in FIG. 6.

FIGS. 6 and 7 show a third form of spacer grid in accordance with the invention. This spacer grid also comprises upper and lower grid tiers 2 and 3 formed from intersecting strip members 4 and 5 with the fuel pins 1 extending through corresponding cells 6 in the upper and lower grid tiers 2 and 3. The strip members 4 of the grid tiers 2 and 3 are dimpled on both faces to form rigid locating stops 7 for the fuel pins 1 in the cells 6 of both grid tiers 2 and 3. Two stops 7 extend inwardly into each cell 6 from opposite sides of the cell 6. The fuel pins 1 are held against the stops 7 in the cells 6 by bow springs 8 extending longitudinally between the upper and lower grid tiers 2 and 3.

In alternate lines of cells which run transversely to the strip members 5 in the grid tiers 2 and 3 the bow springs 8 are placed on the right hand side of the cells 6 holding the fuel pins 1 against the stops 7 which are positioned towards the left hand side of the cells 6. In the other alternate lines of cells 6 which run transversely to the strip members 5 in the grid tiers 2 and 3 the bow springs 8 are placed on the left hand side of the cells 6 holding the fuel pins 1 against the stops 7 which are positioned towards the right hand side of the cells 6.

The bow springs 8 of each line of cells which run parallel to the strip members 5 in the grid tiers 2 and 3 form part of a ladder spring assembly 9. The corresponding ends of the bow springs 8 in the ladder spring assembly are interconnected by longitudinal bridging strips 10. The ladder spring assemblies 9 run between the grid tiers 2 and 3 in alignment with the strip members 5. In each ladder spring assembly the bow springs 8 extend alternately to one side or the other of the plane of the assembly, the bow springs 8 being associated with alternate cells 6 in the lines of cells on either side of the ladder spring assembly. The facing edges of the strip members 5 in the two grid tiers 2 and 3 have transverse slots 11. The edge parts 12 of the strip members 5 between the slots 11 are alternately offset to one side or the other of the plane of the strip members 5. The longitudinal bridging strips 10 of the ladder spring assemblies 9 extend between and are located by the alternately offset edge parts 12 of the strip members 5. The strip members 5 are dimpled on both sides to form rigid back stops 13 in each of the cells 6 in the two grid tiers. One back stop 13 extends into each cell 6 from the side of the cell corresponding to the position of the related bow spring 8. The back stops 13 limit the degree of movement of the fuel pins 1 away from the stops 7 in the cells 6 against the action of the bow springs 8.

The spacer grid of FIGS. 6 and 7 has two individual advantages compared with the other forms of spacer grid described above. Firstly the spacer grid of FIGS. 6 and 7 is readily adaptable to arrangements containing either an odd or an even number of fuel pins. Secondly the need for a back to back arrangement of stops on individual strip members of the other grids is avoided. Thus the strip members 4 having the stops 7 in the spacer grid of FIGS. 6 and 7 can be of small depth with a corresponding reduction in the volume of material used in the construction of the grid.

The grid tiers of all the embodiments described above are fabricated from a material compatible with the conditions in the reactor, for example stainless steel, or where neutron economy is required of a material having a low neutron absorption cross section such as zircaloy. The embodiment of FIG. 3 is particularly suitable for fabrication in a material such as zircaloy. All points of intersection of the strip members in the grid tiers are brazed or welded. The ladder spring assemblies are fabricated from a material having the required spring characteristics, such as stainless steel, inconel or nimonic alloys. In all the embodiments the grid tiers can be built up and brazed or welded before the ladder spring assemblies are added. This method of construction avoids the possibility of the material characteristics of the ladder spring assemblies being changed due to the heat applied during welding or brazing operations on the grid tiers. For instance in the spacer grid of FIGS. 1 and 2 the grid tiers 2 and 3 after fabrication are slotted together with the ladder spring assemblies 9 and are then assembled together within the outer band of the spacer grid. In the case of the spacer grids of FIG. 3, FIGS. 4 and 5, and FIGS. 6 and 7 the ladder spring assemblies are slidable sideways into position betwwen the grid tiers 2 and 3.

Also in the spacer grids of FIG. 3, FIGS. 4 and 5, and FIGS. 6 and 7 the ladder spring assemblies may be fitted with or without clearance between the grid tiers to leave the ends of the bow springs 8 freely movable or "encastre" as described above in relation to the spacer grid of FIGS. 1 and 2.

In general the ladder spring assembly of the invention offers less resistance to coolant flow over the fuel pins in the area of the bow springs thus allowing more efficient cooling of the fuel pins at the bow spring to fuel pin point of contact.

I claim:

1. A spacer member for holding nuclear fuel rods in spaced relation with their axes parallel, comprising a pair of substantially parallel and spaced-apart upper and lower grids formed from a plurality of intersecting metal strips so as to define a plurality of generally rectangular fuel rod cells, the cells of the two grids being aligned in pairs to allow a nuclear fuel rod to pass thorugh each pair and to retain the fuel rod within the aligned pair of cells, the metal strips being deformed to provide a plurality of stop members at least one of which protrudes into each of said cells to contact a fuel rod placed therein, means defining a plurality of bow springs at least one of which projects into each space that extends between each aligned pair of cells, said means comprising a plurality of elongate ladder-shaped members each having two parallel edge portions joined at intervals with transverse portions, said transverse portions forming said bow springs, one of said parallel edge portions of each of said ladder-shaped members being releasably connected to the upper parallel grid and the other edge portion being releasably connected to the lower grid, with the bow springs extending between upper and lower grids, each of said transverse portions being deformed as a bow spring to resiliently urge a fuel rod into engagement with the stop members, each ladder-shaped member extending in one direction across each grid structure and spanning a plurality of cells in each grid structure.

* * * * *